United States Patent
Ishimoto et al.

(10) Patent No.: US 11,906,333 B2
(45) Date of Patent: Feb. 20, 2024

(54) POSITION DETECTION DEVICE AND CONVEYANCE DEVICE

(71) Applicant: DMG MORI CO., LTD., Nara (JP)

(72) Inventors: Shigeru Ishimoto, Kanagawa (JP); Kayoko Taniguchi, Kanagawa (JP); Chihiro Murayama, Kanagawa (JP)

(73) Assignee: DMG MORI CO., LTD., Nara (JP)

( * ) Notice: Subject to any disclaimer, the term of this patent is extended or adjusted under 35 U.S.C. 154(b) by 81 days.

(21) Appl. No.: 16/597,475

(22) Filed: Oct. 9, 2019

(65) Prior Publication Data

US 2020/0132505 A1 Apr. 30, 2020

(30) Foreign Application Priority Data

Oct. 26, 2018 (JP) .................. 2018-201752

(51) Int. Cl.
*G01D 5/347* (2006.01)
*G01D 5/00* (2006.01)

(52) U.S. Cl.
CPC ........... *G01D 5/34792* (2013.01); *G01D 5/00* (2013.01)

(58) Field of Classification Search
CPC ........ G01D 5/00; G01D 5/249; G01D 5/2492; G01D 5/2497; G01D 5/3473; G01D 5/34746; G01D 5/34776; G01D 5/34784; B65G 43/00
USPC ...................................................... 702/150
See application file for complete search history.

(56) References Cited

U.S. PATENT DOCUMENTS

| | | | |
|---|---|---|---|
| 7,499,827 B2 | 3/2009 | Gordon-Ingram | |
| 2003/0069707 A1 | 4/2003 | Uehira | |
| 2012/0326016 A1 | 12/2012 | Ishizuka | |
| 2013/0060520 A1* | 3/2013 | Amor | G01C 15/008 702/154 |
| 2014/0195193 A1 | 7/2014 | Tamiya | |
| 2015/0028098 A1* | 1/2015 | Kleinikkink | B65G 43/10 235/376 |
| 2015/0146217 A1 | 5/2015 | Schoser et al. | |
| 2015/0292919 A1 | 10/2015 | Ogasawara | |
| 2018/0022473 A1* | 1/2018 | Jacobsen | B64F 1/368 198/301 |
| 2020/0301332 A1 | 9/2020 | Imanishi | |

FOREIGN PATENT DOCUMENTS

| | | |
|---|---|---|
| CN | 1461404 A | 12/2003 |
| CN | 102818512 A | 12/2012 |
| EP | 2963393 A1 | 1/2016 |
| EP | 2982939 A1 | 2/2016 |

(Continued)

OTHER PUBLICATIONS

JP2012083280—English translation (Year: 2012).*

(Continued)

*Primary Examiner* — Tung S Lau
*Assistant Examiner* — Dacthang P Ngo
(74) *Attorney, Agent, or Firm* — DiPerna Law Firm, P.C.

(57) ABSTRACT

Data is utilized more efficiently and effectively. A position detection device includes a plurality of scales that each record absolute data embedded with a scale ID for identifying a scale, a detector that detects the absolute data from each of the plurality of scales, and an extractor that extracts, from the detected absolute data, the scale ID and position data representing the position of the scale.

11 Claims, 14 Drawing Sheets

(56) References Cited

FOREIGN PATENT DOCUMENTS

| | | |
|---|---|---|
| JP | H5178456 A | 7/1993 |
| JP | H8304105 A | 11/1996 |
| JP | 2002131089 A | 5/2002 |
| JP | 2005337757 A | 12/2005 |
| JP | 2006343110 A | 12/2006 |
| JP | 2007121277 A | 5/2007 |
| JP | 4166490 52 | 10/2008 |
| JP | 2010179463 A | 8/2010 |
| JP | 2011161695 A | 8/2011 |
| JP | 201283280 A | 4/2012 |
| JP | 2014134532 A | 7/2014 |
| JP | 2017044500 A | 3/2017 |
| JP | WO2017183396 A1 | 2/2019 |
| KR | 101328996 B1 | 11/2013 |

OTHER PUBLICATIONS

Japanese office action with an English translation dated May 10, 2022 for Application No. JP 2018-201752.

Notice of Decision of Granting Patent Right for Invention (Notice of Allowance) dated May 18, 2023, in Chinese Patent Application No. 201911021950.1, with an English translation thereof, 7 pages.

Fang, Yi-xiang, et al., "Coordinate Measuring Information Extraction of Parts Based on MBD Dataset", Computer Integrated Manufacturing Systems, vol. 19, No. 7, Jul. 2013 (Year: 2013), DOI: 10.13196/j.cims.2013.07.94.fangyx.006, 9 pages, with English abstract.

Office Action dated Nov. 14, 2022, in Chinese Patent Application No. 201911021950.1, with an English machine translation thereof, 19 pages.

\* cited by examiner

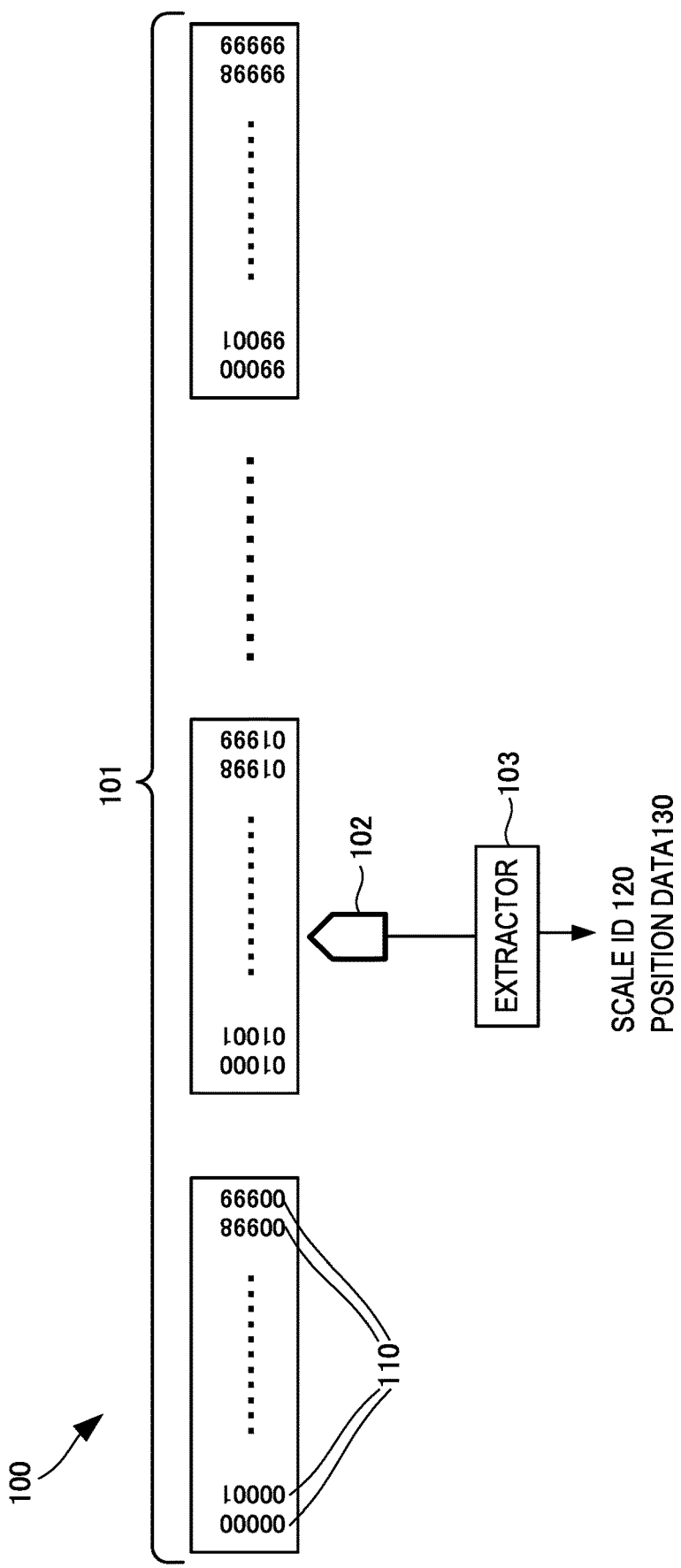

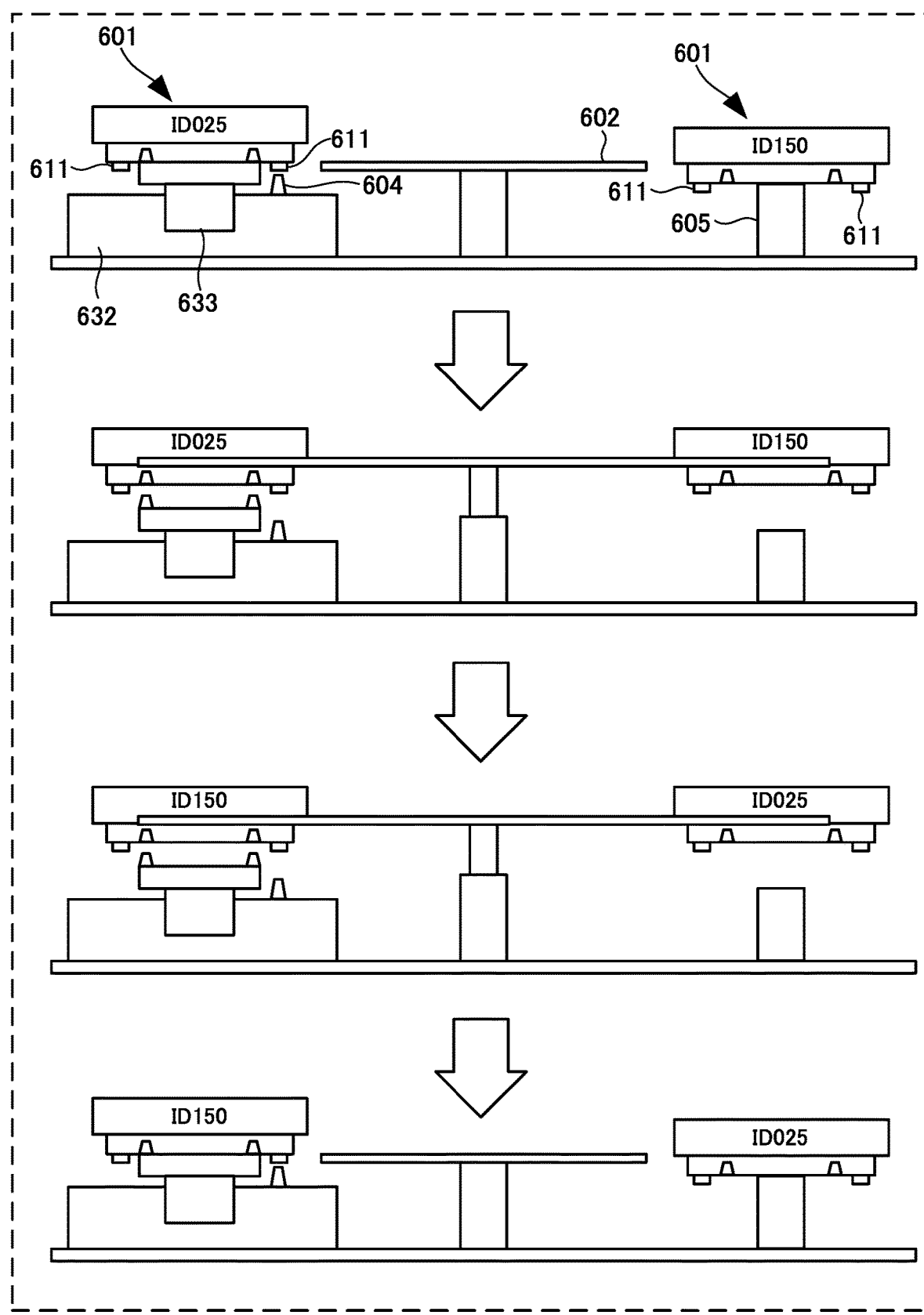
F I G. 6E

POSITION DETECTION DEVICE AND CONVEYANCE DEVICE

This application is based upon and claims the benefit of priority from Japanese patent application No. 2018-201752, filed on Oct. 26, 2018, the disclosure of which is incorporated herein in its entirety by reference.

BACKGROUND OF THE INVENTION

Field of the Invention

The present invention relates to a position detection device and a conveyance device.

Description of the Related Art

In the above technical field, patent literature 1 discloses a technique of utilizing absolute data for position detection.
[Patent Literature 1] Japanese Patent No. 4166490

SUMMARY OF THE INVENTION

In the technique described in the above literature, however, it is impossible to utilize the data more efficiently and effectively.

The present invention provides a technique of solving the above-described problem.

One example aspect of the present invention provides a position detection device comprising:
 a plurality of scales that each record absolute data embedded with a scale ID for identifying a scale;
 a detector that detects the absolute data from each of the plurality of scales; and
 an extractor that extracts, from the detected absolute data, the scale ID and position data representing a position of the scale.

Another example aspect of the present invention provides a conveyance device comprising:
 a plurality of conveyors each including a scale that records absolute data embedded with a conveyor ID for identifying a movable conveyor;
 a detector that detects the absolute data from the scale of each of the plurality of conveyors; and
 an extractor that extracts, from the detected absolute data, the conveyor ID and position data representing a position of the conveyor.

According to the present invention, it is possible to utilize the data more efficiently and effectively.

BRIEF DESCRIPTION OF THE DRAWINGS

FIG. 1 is a block diagram showing the arrangement of a position detection device according to the first example embodiment of the present invention;

FIG. 6E is a view for explaining replacement of a pallet by the processing apparatus including the position detection device according to the fifth example embodiment of the present invention.

DESCRIPTION OF THE EXAMPLE EMBODIMENTS

Figure 2A:
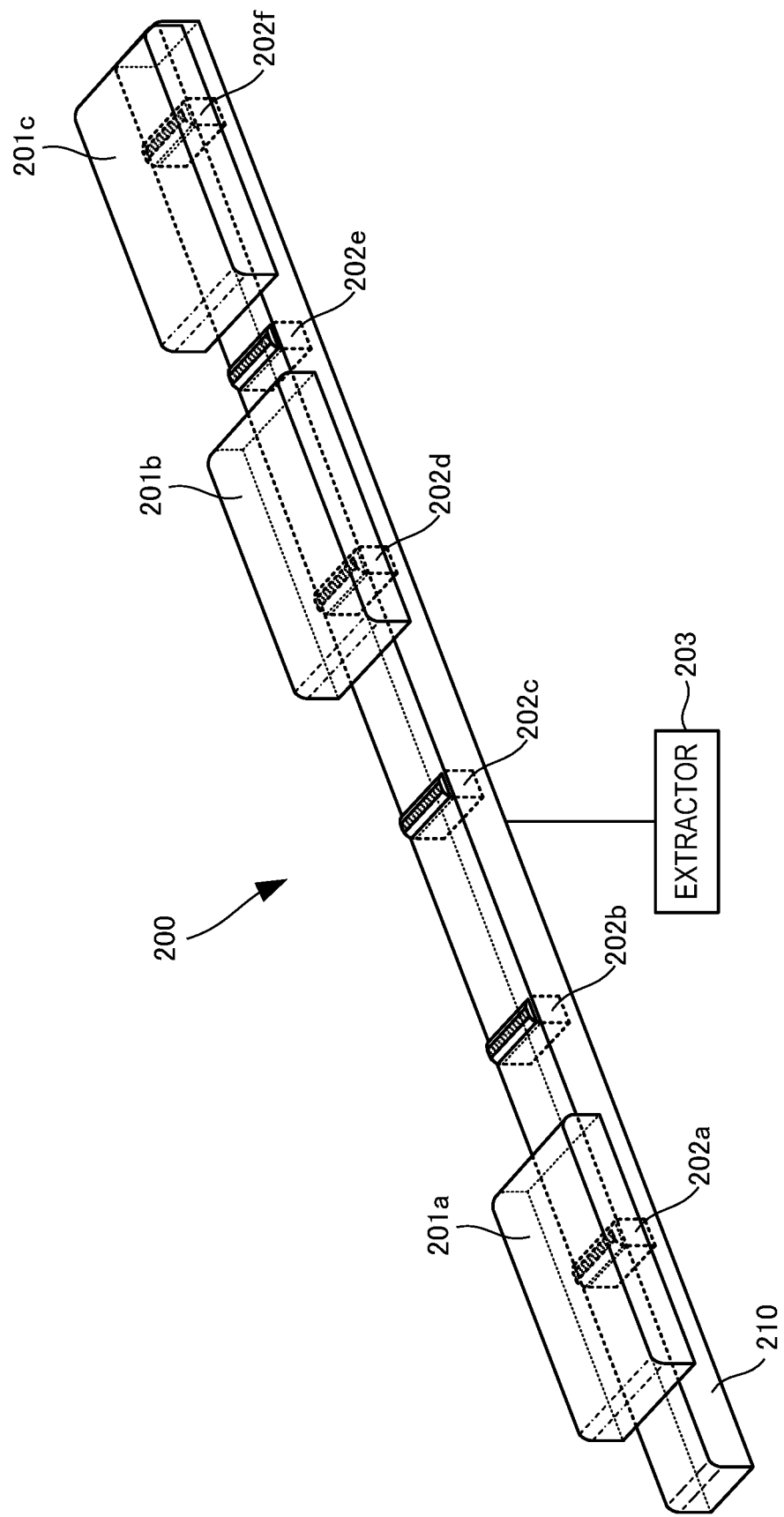
FIG. 2A is a perspective view for explaining a conveyance device including a position detection device according to the second example embodiment of the present invention.

Example embodiments of the present invention will now be described in detail with reference to the drawings. It should be noted that the relative arrangement of the components, the numerical expressions and numerical values set forth in these example embodiments do not limit the scope of the present invention unless it is specifically stated otherwise.

First Example Embodiment

A position detection device 100 according to the first example embodiment of the present invention will be described with reference to FIG. 1. The position detection device 100 is a device that detects the absolute data recorded on a scale, thereby extracting the scale ID and the position data of the scale.

As shown in FIG. 1, the position detection device 100 includes scales 101, a detector 102, and an extractor 103. The position detection device 100 includes a plurality of scales 101 each scale records absolute data 110 embedded with a scale ID for identifying the scale 101. The detector 102 detects the absolute data 110 from each of the plurality of scales 101. The extractor 103 extracts, from the detected absolute data 110, a scale ID 120 and position data 130 representing the position of the scale.

According to this example embodiment, since a plurality of scales each recording absolute data embedded with a scale ID for identifying a scale are used, it is possible to utilize the data more efficiently and effectively.

Second Example Embodiment

A conveyance device including a position detection device according to the second example embodiment of the present invention will be described next with reference to FIGS. 2A to 3B. FIG. 2A is a perspective view for explaining the conveyance device including the position detection device according to this example embodiment.

As shown in FIG. 2A, a conveyance device 200 includes conveyors 201a to 201c, detectors 202a to 202f, an extractor 203, and a conveyance guide 210.

Each of the conveyors 201a to 201c is movable on the conveyance guide 210, and conveys a conveyance object 212 loaded thereon to a predetermined place. A scale 211 and a mover (magnet) of a linear motor are arranged on the bottom surface of the conveyor 201, that is, on the surface of each of the conveyors 201a to 201c facing the conveyance guide 210. In addition, each of the conveyors 201a to 201c includes a scale (not shown), and absolute data is recorded on the scale.

The stators (coil side) of the linear motor are arranged in the conveyance guide 210. In addition, the detectors 202 are arranged in the conveyance guide 210. A plurality of conveyors 201 are arranged on the conveyance guide 210. Each of the conveyors 201a to 201c moves on the conveyance guide 210 to convey a predetermined conveyance object to a predetermined conveyance destination.

The detectors 202a to 202f detect the absolute data from the scales included in the conveyors 201a to 201c. The extractor 203 extracts, from the detected absolute data, the conveyor ID (Identifier) and the position data representing the position of each of the conveyors 201a to 201c. Here, the scales provided in the conveyors 201, the detectors 202, and the extractor 203 correspond to the position detection device.

Figure 2B:
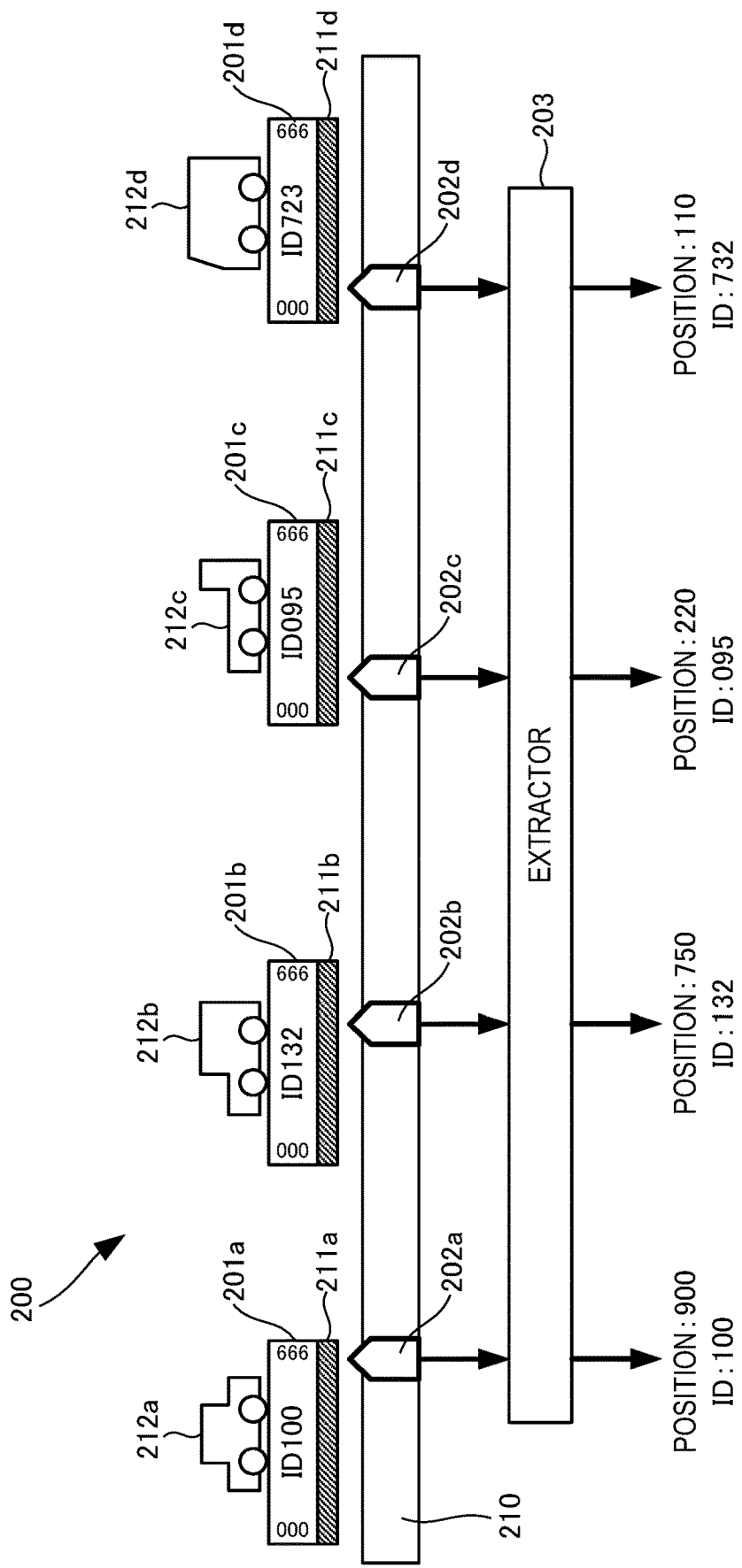
FIG. 2B is a view for explaining an outline of extraction of a conveyor ID and position data by the conveyance device including the position detection device according to the second example embodiment of the present invention.

FIG. 2B is a view for explaining an outline of extraction of a conveyor ID and position data by the conveyance device including the position detection device according to this example embodiment.

Scales 211a to 211d are provided in the conveyors 201a to 201d, respectively. Absolute data embedded with scale IDs for identifying the scales 211a to 211d are recorded on the scales 211a to 211d, respectively. Each of the scales 211a to 211f includes specific absolute data. That is, unique absolute data is assigned to each of the scales 211a to 211f.

The conveyors 201a to 201d move on the conveyance guide 210, and convey loaded conveyance objects 212a to 212d to a predetermined conveyance destination.

The detectors 202a to 202d detect the absolute data recorded on the scales 211a to 211d provided in the conveyors 201a to 201d, respectively. The absolute data detected by the detectors 202a to 202d are transmitted to the extractor 203.

The extractor 203 that has received the absolute data transmitted from the detector 202a to 202d extracts, from the detected absolute data, the conveyor ID (scale ID) and the position data representing the position of each of the conveyors 201a to 201d.

For example, the detector 202a detects the absolute data recorded on the scale 211a provided in the conveyor 201a. The detector 202a transmits the detected absolute data to the extractor 203. Then, the extractor 203 extracts, from the absolute data received from the detector 202a, the conveyor ID (ID: 100) (the identifier of the conveyor 201a) and the position (900) (position data) of the conveyor 201a.

Similarly, the detector 202b detects the absolute data recorded on the scale 211b provided in the conveyor 201b. The detector 202b transmits the detected absolute data to the extractor 203. Then, the extractor 203 extracts, from the absolute data received from the detector 202b, the conveyor ID (ID: 132) and the position (750) of the conveyor 201b. The detectors 202c and 202d perform the similar operation, and extract the conveyor ID (ID: 095) of the conveyor 201c and the conveyor ID (ID: 732) of the conveyor 201d, and the position (220) of the conveyor 201c and the position (110) of the conveyor 201d, respectively.

Thus, the position data of the conveyors 201a to 201d can be obtained, so that the conveyors 201a to 201d can be positioned accurately. Further, since the conveyor IDs of the conveyors 201a to 201d can be obtained, the conveyance objects 212a to 212d loaded on the conveyors 201a to 201d can be distinguished by linking the conveyor IDs with the conveyance objects 212a to 212d, respectively. Furthermore, the positions of the distinguished conveyance objects 212a to 212d can be specified.

Figure 3A:
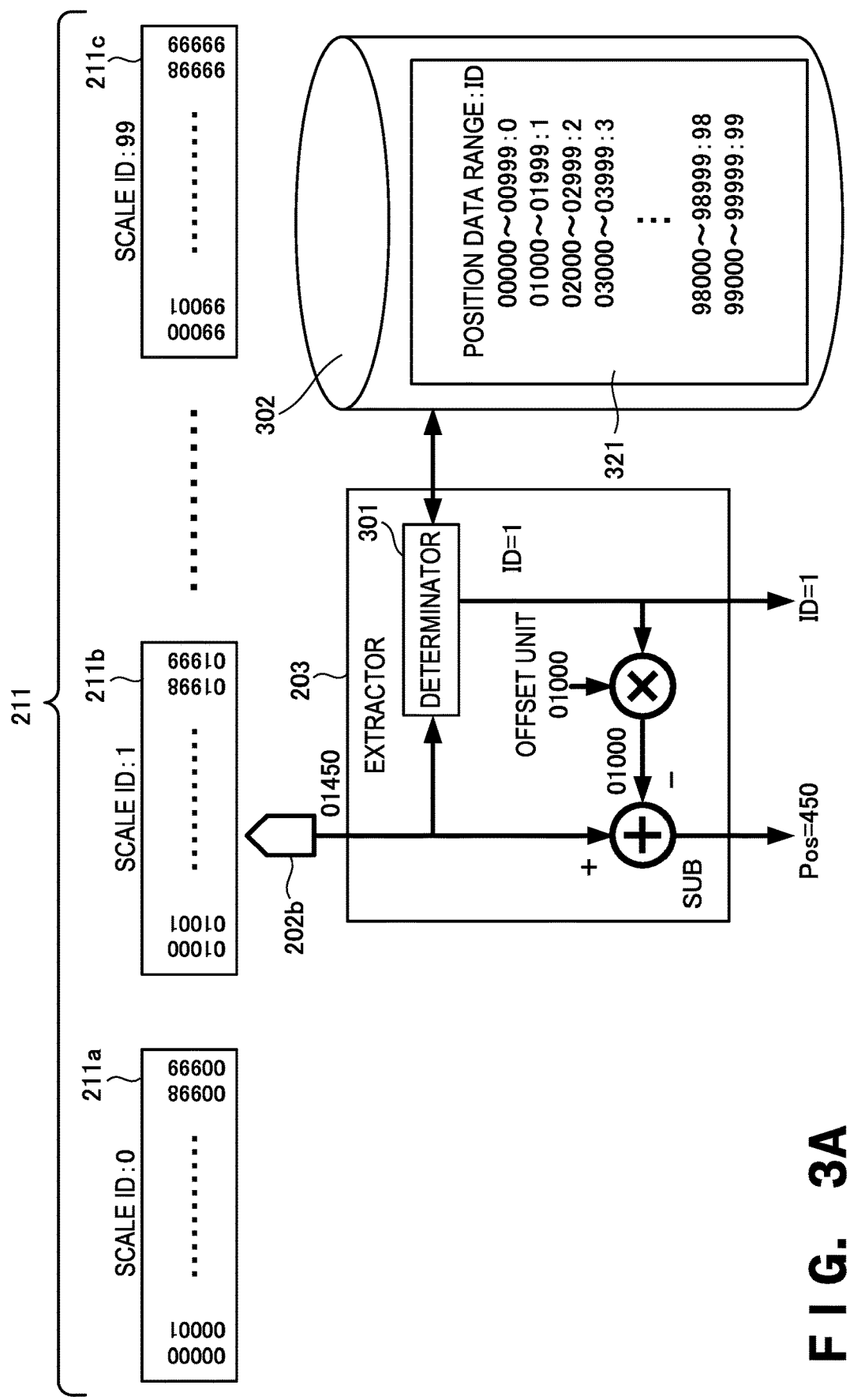
FIG. 3A is a view for explaining extraction of a conveyor ID and position data by the conveyance device including the position detection device according to the second example embodiment of the present invention.

Next, extraction of a conveyor ID and position data will be described with reference to FIG. 3A. FIG. 3A is a view for explaining extraction of a conveyor ID and position data by the conveyance device including the position detection device according to this example embodiment.

Specific absolute data are recorded on each of the scales 211. That is, the scale 211a includes absolute data "00000 to 00999", and the scale 211b includes absolute data "01000 to 01999". The scale 211c includes absolute data "99000 to 99999". In this manner, in the example shown in FIG. 3A, the offset value of the absolute data between the scales 211 is set to 1000. That is, the absolute data are recorded on the scales 211 while setting the offset unit between the scales 211 to be 1000.

Note that the scale 211a is attached to the conveyor 201a, the scale 211b is attached to the conveyor 201b, and the scale 211c is attached to the conveyor 201c.

Next, extraction of a conveyor ID and position data will be described using an example in which the detector 202b detects the absolute data of the scale 211b. The detector 202b detects the absolute data "01450" as the position data of the scale 211b. The detector 202b transmits the detected absolute data to the extractor 203. A determinator 301 of the extractor 203 that has received the absolute data detected by the detector 202b refers to a table 321 stored in a storage 302. The table 321 stores the correspondence between the position data range and the scale ID (conveyor ID).

The determinator 301 refers to the table 321 and compares the data stored in the table 321 with the data detected by the detector 202b. The determinator 301 determines that "01450" falls within a position data range of "01000 to 01999", and determines the scale ID to be "1". In this manner, the extractor 203 determines the scale ID (conveyor ID).

Next, determination of the position data of a scale will be described. When the offset unit (1000) multiplied by the scale ID "1" is subtracted from the position data "01450", a value "450" is obtained (1450−(1000×1)). This value serves as the position data representing the position of the scale 211b. Thus, the extractor 203 obtains the scale ID "1" and position data "450" of the scale 211b.

Although not shown, for example, consider a case in which the detector 202 detects the absolute data "03500" as the position data of the scale 211. With reference to the table 321, "03500" falls within a position data range of "03000 to 03999", so the ID is found to be "3". When the offset unit (1000) multiplied by the ID "3" is subtracted from the position data "03500", a value "00500" is obtained (3500−(1000×3)). This value serves as the position data. By calculating in this manner, the conveyor ID for identifying the scale 211, that is, each of the conveyors 201a to 201d, and the position data representing the position of each of the conveyors 201a to 201d can be obtained. Note that the offset unit has been described to be "1000", but the value of the offset unit is not limited to this.

When each of scale 211 has the same length, the offset value is constant at, for example, a value of "1000". Therefore, the position data and the scale ID (conveyor ID) can be obtained without storing the correspondence as in the table 321. In this case, the offset unit (1000) is subtracted from the obtained position data, and the subtraction is repeated until the subtraction value becomes a numerical value equal to or smaller than the offset value. Then, the number of repetitions of the subtraction serves as the scale ID (conveyor ID). Further, the value obtained as a result of the subtractions, which is a numerical value smaller than the offset value, serves as the position data.

In the example described above, a method of obtaining a scale ID and position data by subtracting the offset unit from obtained position data, but a scale ID and position data can be obtained from, for example, the quotient and remainder obtained by dividing obtained position data by the offset unit. In this case, the quotient corresponds to the scale ID, and the remainder corresponds to the position data.

Figure 3B:
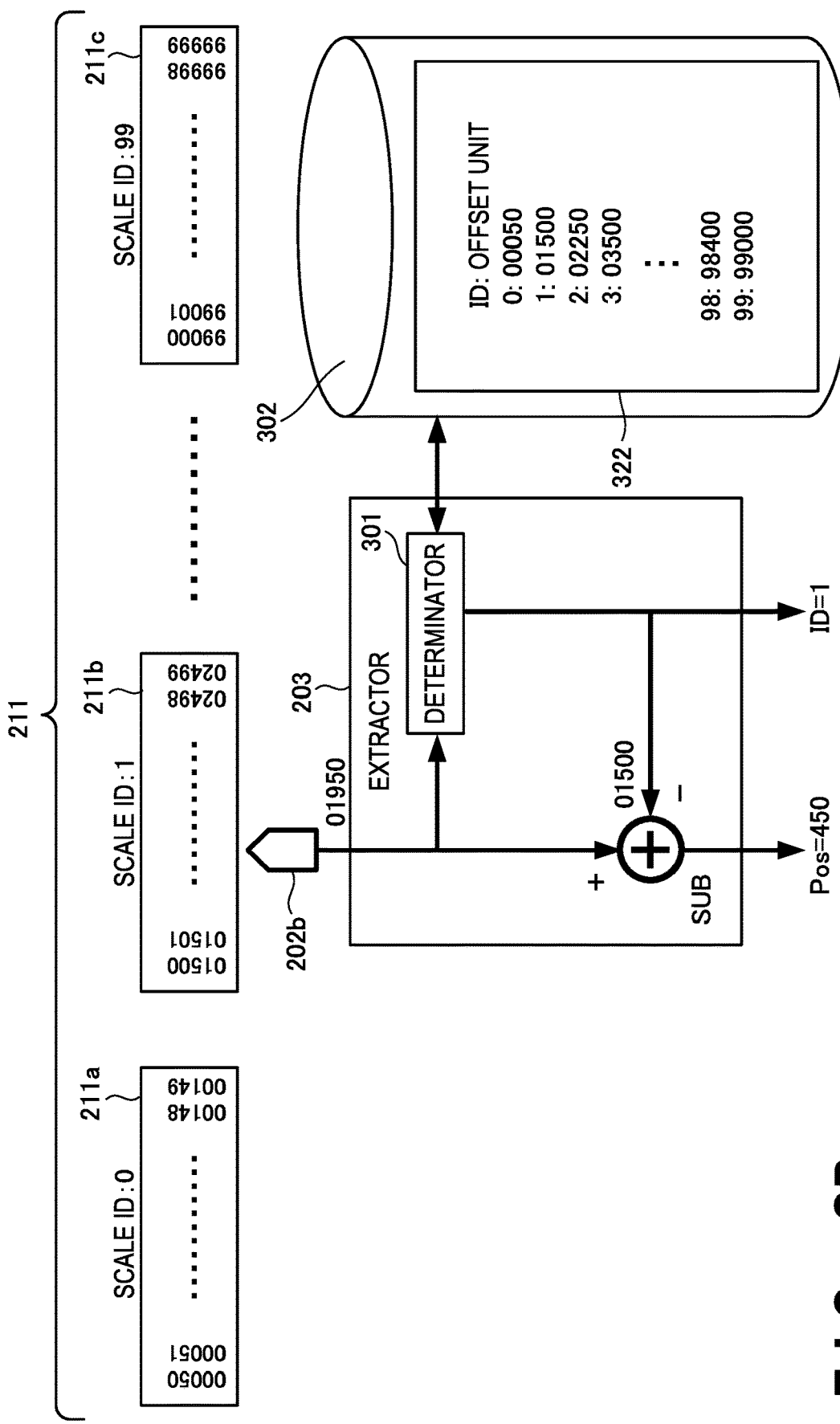
FIG. 3B is another view for explaining extraction of a conveyor ID and position data by the conveyance device including the position detection device according to the second example embodiment of the present invention.

Next, a case in which the length differs among the scales 211, that is, the offset value changes for each scale will be described with reference to FIG. 3B. FIG. 3B is another view for explaining extraction of a conveyor ID and position data by the conveyance device including the position detection device according to this example embodiment. In this case, a table 322 storing the correspondence between the scale ID (conveyor ID) and the offset unit is stored in the storage 302. The determinator 301 refers to the table 322 to obtain the scale ID and the position data. In this manner, if the offset unit is known for each scale ID, this offset unit corresponds to the position data range, so that the position data can be obtained from the scale ID and the offset unit.

Note that in the above description, the conveyance device in which the conveyor 201 moves on the conveyance guide 210 has been used to describe this example embodiment, but the conveyor ID (scale ID) and position data can be extracted even when the conveyor 201 does not move on the conveyance guide 210. For example, when a user places the conveyor 201 on the conveyance guide 210 by hand, the detector 202 can detect the absolute data from the scale of the conveyor 201 placed on the conveyance guide 210. Therefore, it is possible to extract the conveyor ID (scale ID) and position data of the conveyor 201 placed on the conveyance guide 210.

According to this example embodiment, since a plurality of scales each recording absolute data embedded with a scale ID for identifying a scale are used, it is possible to utilize the data more efficiently and effectively. In addition, without assigning a scale ID to the scale, it is possible to achieve both position detection and scale identification from the absolute data recorded on the scale. Furthermore, by offsetting the offset value corresponding to the scale ID, the position data representing the position of the scale can be obtained easily and quickly.

Third Example Embodiment

Figure 4:
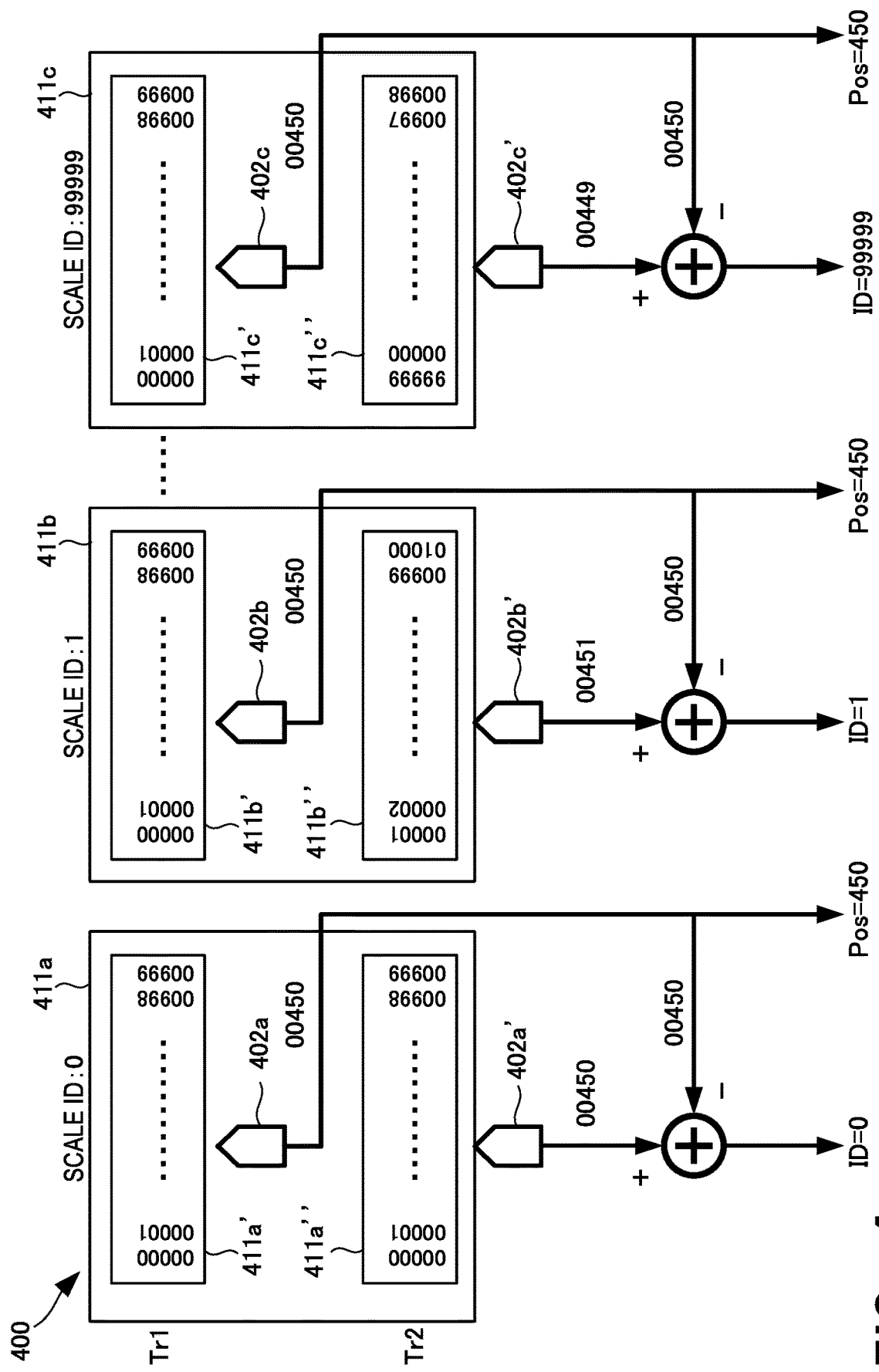
FIG. 4 is a view for explaining extraction of a conveyor ID and position data by a conveyance device including a position detection device according to the third example embodiment of the present invention.

Extraction of a scale ID and position data by a conveyance device including a position detection device according to the third example embodiment of the present invention will be described next with reference to FIG. 4. FIG. 4 is a view for explaining extraction of a conveyor ID and position data by the conveyance device including the position detection device according to this example embodiment. The conveyance device including the position detection device according to this example embodiment is different from that in the above-described second example embodiment in that one scale includes a plurality of tracks. The remaining components and operations are similar to those in the second example embodiment. Hence, the same reference numerals denote the similar components and operations, and a detailed description thereof will be omitted.

A conveyance device 400 includes a scale 411a, a scale 411b, a scale 411c, detectors 402a and 402a', detectors 402b and 402b', and detectors 402c and 402c'.

The scale 411a includes tracks 411a' and 411a". Similarly, the scale 411b includes tracks 411b' and 411b", and the scale 411c includes tracks 411c' and 411c". That is, each of the scale 411a, the scale 411b, and the scale 411c includes two tracks. These scales 411a, 411b, and 411c are attached to conveyors (not shown).

The detector 402a detects the absolute data of the track 411a' of the scale 411a. The detector 402a' detects the absolute data of the track 411a" of the scale 411a. In the illustrated example, each of the detector 402a and the detector 402a' detects the absolute data "00450".

In this case, the difference between the absolute data detected by the detectors 402a and 402a' is "0" (00450−00450=0). That is, in the scale 411a, the absolute data in the same arrangement are recorded on the track 411a' and the track 411a".

The conveyance device 400 extracts the difference (0) as the scale ID of the scale 411a (ID=0), and extracts the absolute data detected by the detector 402a as the position data (450) representing the position of the scale 411a.

The detector 402b detects the absolute data of the track 411b' of the scale 411b. The detector 402b' detects the absolute data of the track 411b" of the scale 411b. In the illustrated example, the detector 402b detects the absolute data "00450", and the detector 402b' detects the absolute data "00451".

In this case, the difference between the absolute data (00451) detected by the detector 402b' and the absolute data (00450) detected by the detector 402b is "1" (00451−00450=1). That is, in the scale 411b, the absolute data recorded on the track 411b' at an identical position to that on the track 411b" is offset by "1".

The conveyance device 400 extracts the difference (1) as the scale ID of the scale 411b (ID=1), and extracts the absolute data detected by the detector 402b as the position data (450) representing the position of the scale 411b.

In addition, the detector 402c detects the absolute data of the track 411c' of the scale 411c. The detector 402c' detects the absolute data of the track 411c" of the scale 411c. In the illustrated example, the detector 402c detects the absolute data "00450", and the detector 402c' detects the absolute data "00449".

In this case, the difference between the absolute data (00449) detected by the detector 402c' and the absolute data (00450) detected by the detector 402c is "99999" (00449−00450=99999: in this case, since the absolute data is 5-digit data, the difference is not 1 but such a value). That is, in the scale 411c, the absolute data recorded on the track 411c' at an identical position to that on the track 411c" is offset by "99999".

The conveyance device 400 extracts the difference (99999) as the scale ID of the scale 411c (ID=99999), and extracts the absolute data detected by the detector 402c as the position data (450) representing the position of the scale 411c.

In this manner, by providing an offset between the tracks in each of the scales 411a to 411c, it is possible to utilize the offset value between the tracks as the scale ID of each of the scales 411a to 411c. Therefore, by calculating the difference between the absolute data of the tracks of each of the scales 411a to 411c, the scale ID of each of the scales 411a to 411c can be easily extracted.

According to this example embodiment, it is possible to achieve both position detection and scale identification without complicated calculations. In addition, it is possible to identify a plurality of scales without complicated calculations. Furthermore, since it is unnecessary to refer to a table or the like, position detection and scale identification can be performed easily and quickly.

Fourth Example Embodiment

Figure 5A:
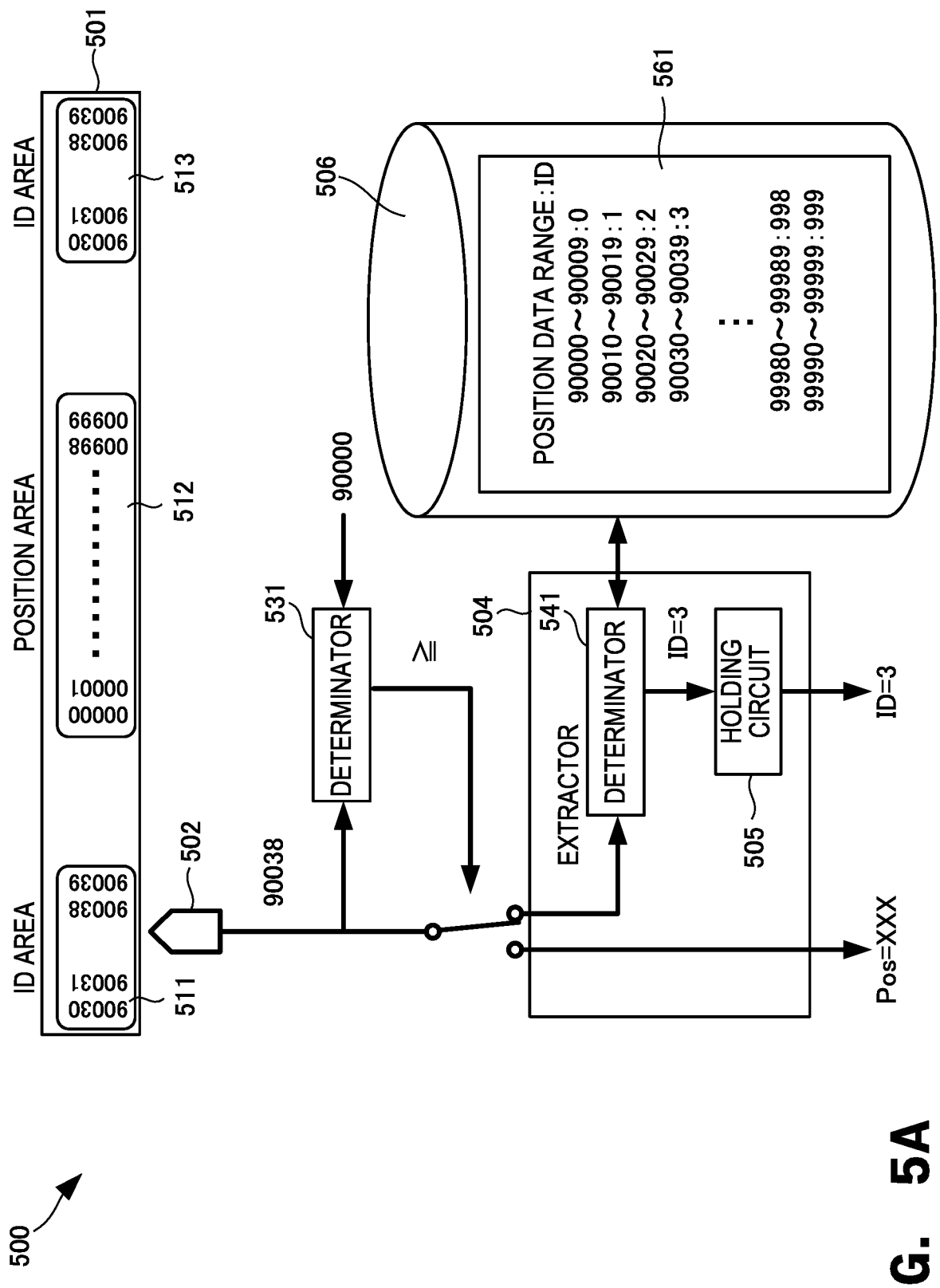
FIG. 5A is a view for explaining extraction of a conveyor ID and position data by a conveyance device including a position detection device according to the fourth example embodiment of the present invention.
Figure 5B:
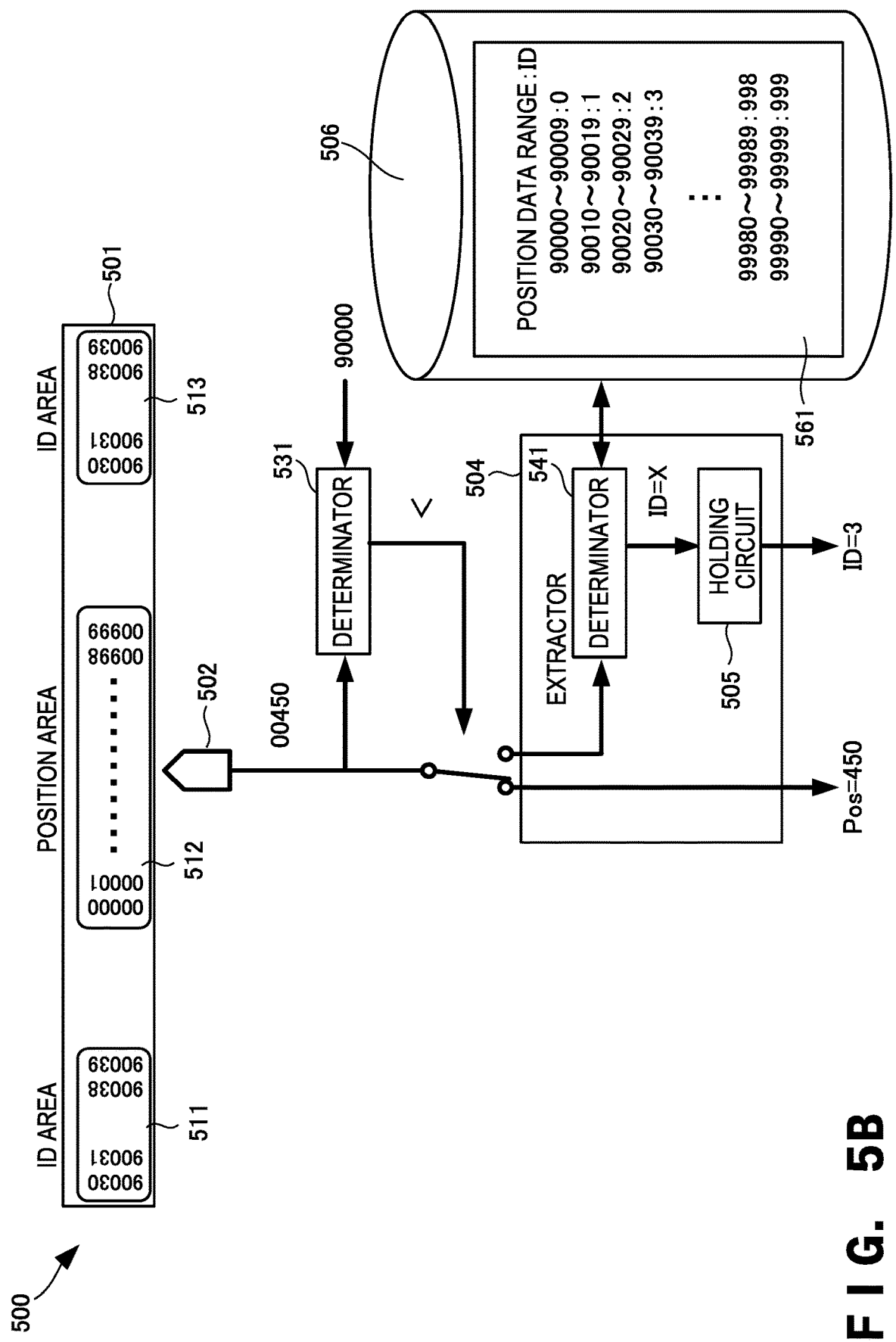
FIG. 5B is another view for explaining extraction of the conveyor ID and position data by the conveyance device including the position detection device according to the fourth example embodiment of the present invention.

Extraction of a scale ID and position data by a conveyance device including a position detection device according to the fourth example embodiment of the present invention will be described next with reference to FIGS. 5A and 5B. FIG. 5A is a view for explaining extraction of a conveyor ID and position data by the conveyance device including the position detection device according to this example embodiment. FIG. 5B is another view for explaining extraction of the conveyor ID and position data by the conveyance device including the position detection device according to this example embodiment. The conveyance device including the position detection device according to this example embodiment is different from those in the above-described second and third example embodiments in that a scale includes ID areas and a position area, and in that it includes one detector. The remaining components and operations are similar to those in the second and third example embodiments. Hence, the same reference numerals denote the similar components and operations, and a detailed description thereof will be omitted.

A conveyance device 500 includes a scale 501, a detector 502, an extractor 503, an extractor 504, a holding circuit 505, and a storage 506.

The scale 501 includes ID areas 511 and 513, and a position area 512. Each of the ID areas 511 and 513 is a data area for embedding a scale ID for identifying the scale. The position area 512 is a data area for embedding position data representing the position. That is, absolute data indicating the scale ID are recorded in the ID areas 511 and 513, and absolute data indicating the position data is recorded in the position area 512. In the illustrated example, the absolute data (90000 to 99999) equal to or larger than 90000 are recorded in the ID areas 511 and 513, and the absolute data (00000 to 89999) smaller than 90000 are recorded in the position area 512.

Extraction of a scale ID is described with reference to FIG. 5A. The detector 502 detects the absolute data recorded in the ID areas 511 and 513 while the ID areas 511 and 513 of the scale 501 are passing. Then, the detected absolute data, which is "90038" in the illustrated example, is transmitted to a determinator 531. The determinator 531 determines whether the received absolute data is equal to or larger than 90000. If the received absolute data is equal to or larger than 90000, the received absolute data (90038) is transmitted to the extractor 504. A determinator 541 of the extractor 504 refers to a table 561 stored in the storage 506, and determines the scale ID (ID=3) from the received absolute data. The holding circuit 505 holds the scale ID (ID=3).

Next, extraction of position data is described with reference to FIG. 5B. The detector 502 detects the absolute data recorded in the position area 512 while the position area 512 of the scale 501 is passing. Then, the detected absolute data, which is "00450" in the illustrated example, is transmitted to the determinator 531. The determinator 531 determines whether the received absolute data is smaller than 90000. If the received absolute data is smaller than 90000, the conveyance device 500 uses the absolute data (00450) as the position data representing the position of the scale (conveyor).

According to this example embodiment, it is possible to achieve both position detection and scale identification without using a plurality of detectors. In addition, it is possible to identify a number of scales without using a plurality of detectors. Furthermore, since the device can include one detector, a simple device arrangement can be achieved.

Fifth Example Embodiment

Figure 6A:
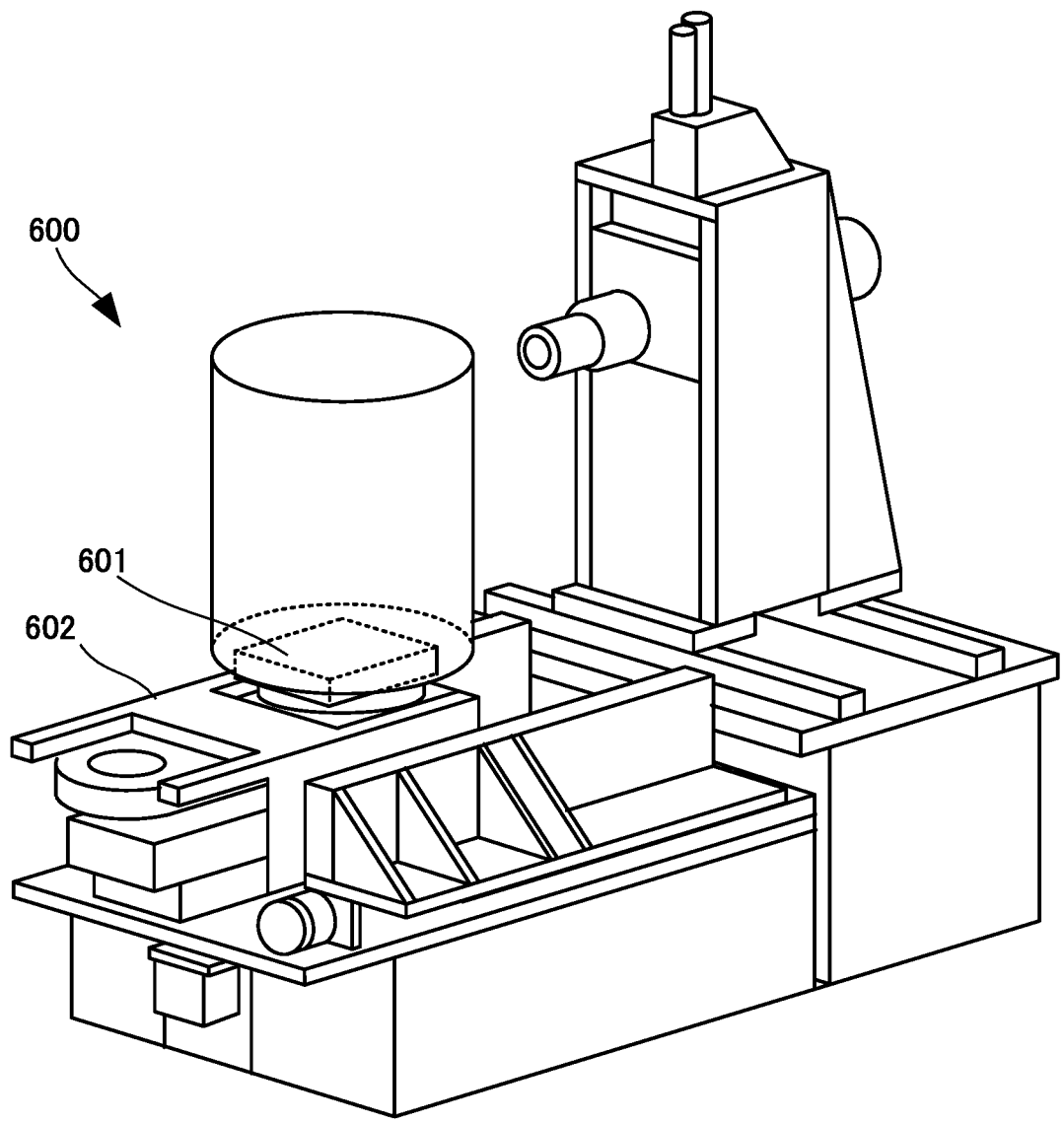
FIG. 6A is a perspective view for explaining the overall arrangement of a processing apparatus including a position detection device according to the fifth example embodiment of the present invention.
Figure 6B:
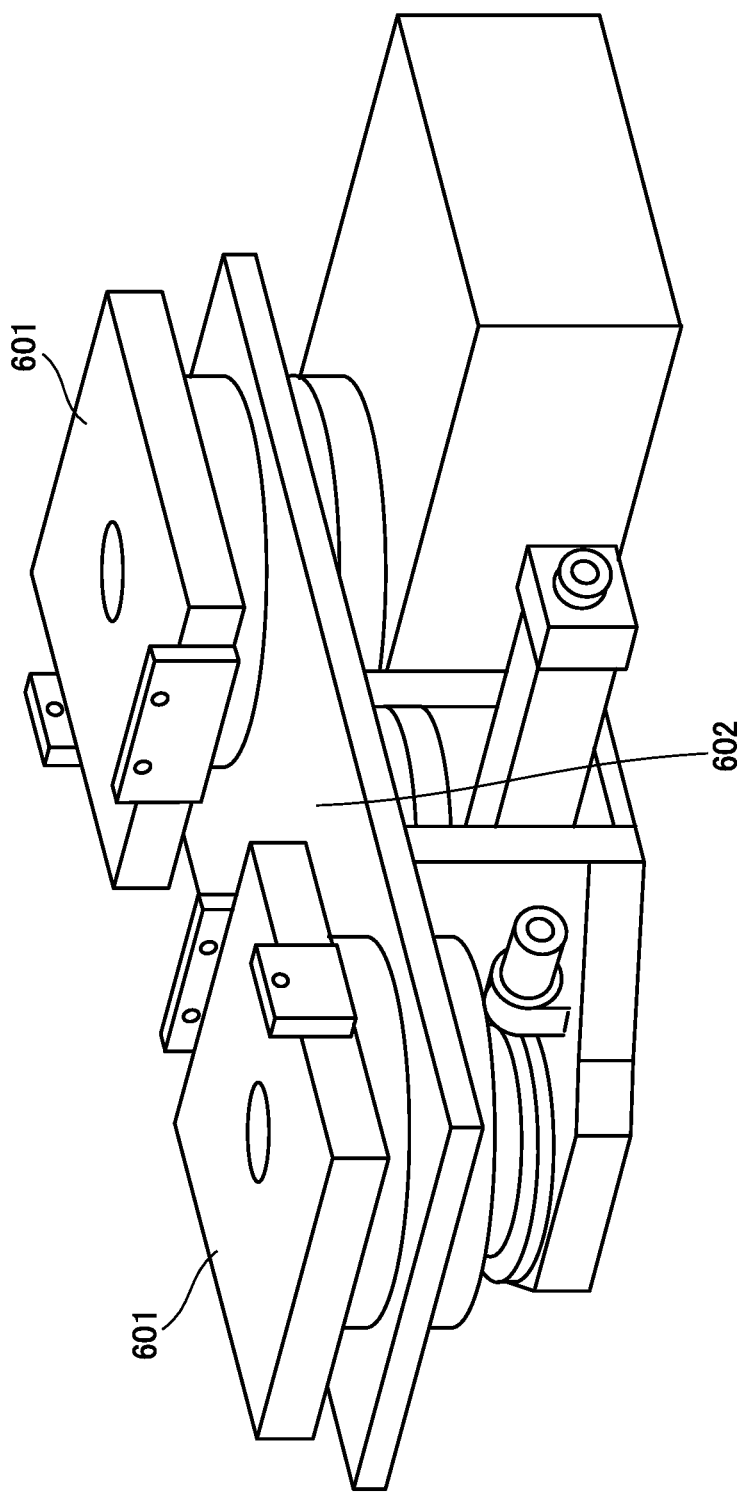
FIG. 6B is a view for explaining a pallet and a pallet changer of the processing apparatus including the position detection device according to the fifth example embodiment of the present invention.

A processing apparatus including a position detection device according to the fifth example embodiment of the present invention will be described next with reference to FIGS. 6A to 6F. FIG. 6A is a perspective view for explaining the overall arrangement of the processing apparatus including the position detection device according to this example embodiment. FIG. 6B is a view for explaining a pallet and a pallet changer of the processing apparatus including the position detection device according to this example embodiment. The processing apparatus including the position detection device according to this example embodiment is different comparing with the above-described second to fourth example embodiments in that the pallet rotates. The remaining components and operations are similar to those in the second to fourth example embodiments. Hence, the same reference numerals denote the similar components and operations, and a detailed description thereof will be omitted.

A processing apparatus 600 includes a pallet 601 and a pallet changer 602. A processing target object to be processed is mounted on the pallet 601. The pallet changer 602 is a mechanism for replacing the pallet 601 with a processing target object mounted thereon. When the pallet 601 is replaced, the pallet changer 602 is once lifted and rotated 180° to replace the pallet 601. In this manner, a processing target object mounted on the pallet 601 is processed while sequentially replacing the pallets 601 by the pallet changer 602.

Figure 6C:
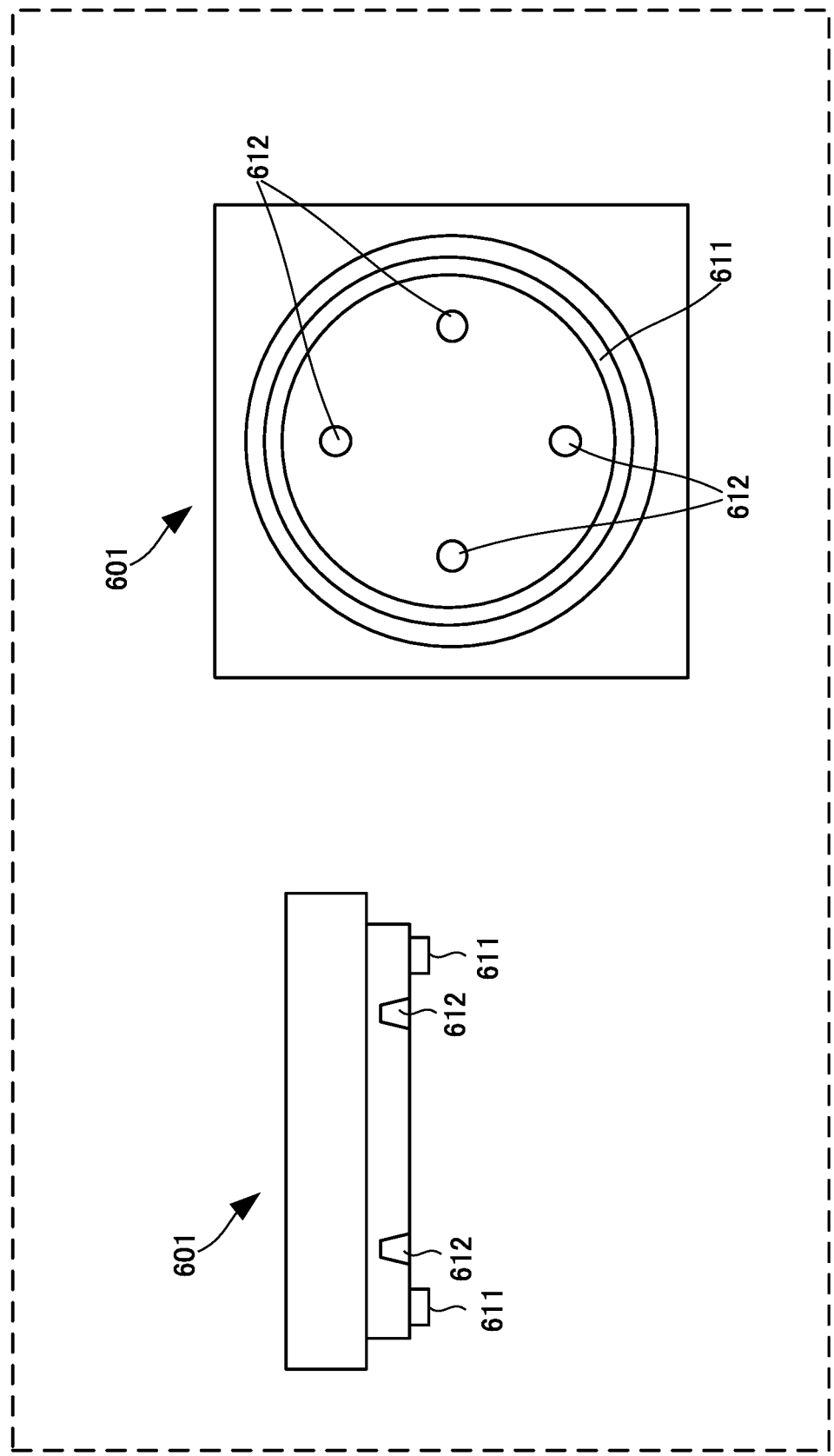
FIG. 6C shows a side view and a bottom view for explaining the structure of the pallet of the processing apparatus including the position detection device according to the fifth example embodiment of the present invention.

FIG. 6C shows a side view and a bottom view for explaining the structure of the pallet of the processing apparatus including the position detection device according to this example embodiment. A scale 611 is provided on the bottom surface of the pallet 601. In addition, chuck holes 612 are provided on the bottom surface of the pallet 601. The scale 611 is circular, and is provided along the outer peripheral side of the bottom surface of the pallet 601. Absolute data embedded with a scale ID for identifying the scale 611 is recorded on the scale 611. The chuck holes 612 are provided on the bottom surface of the pallet 601. A processing target object is mounted and fixed on the pallet 601. Note that the scale 611 provided on the bottom surface of the pallet 601 may be the one-track scale 611 or the multi-track scale 611.

Figure 6D:
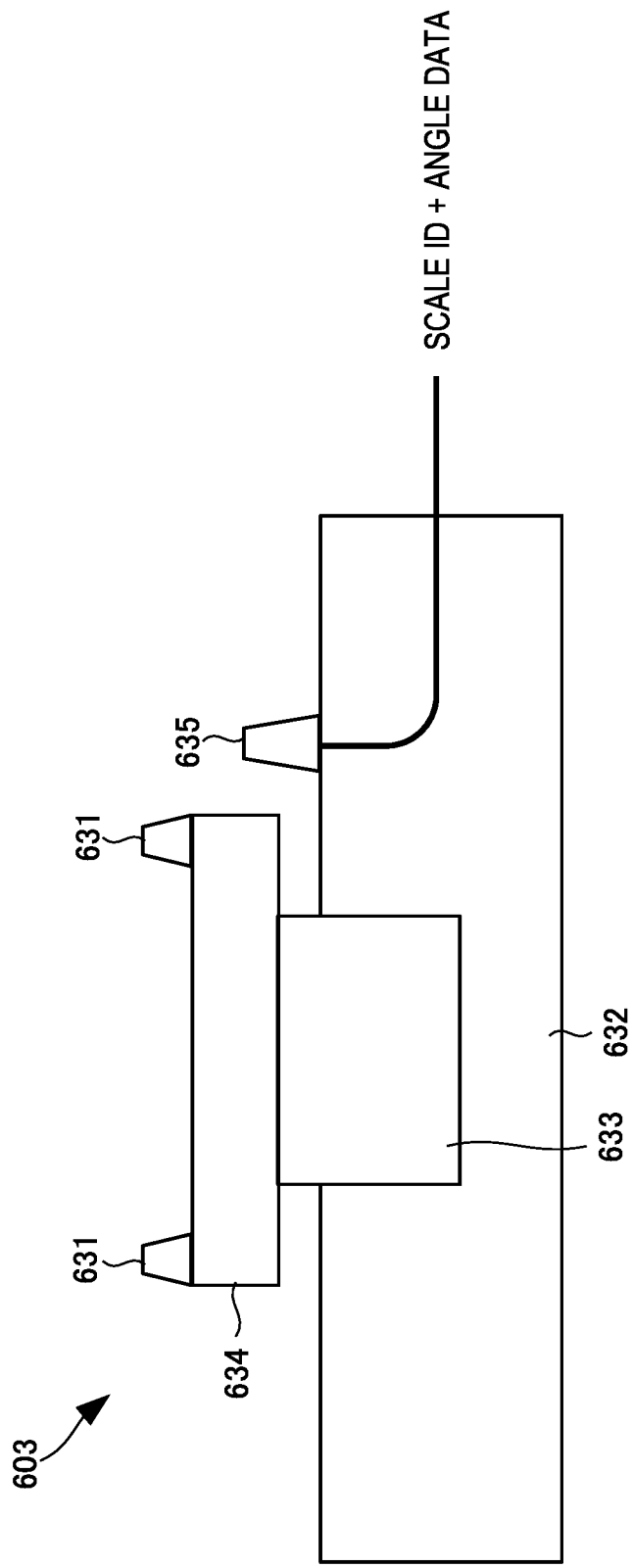
FIG. 6D is a view for explaining the structure of an index head of the processing apparatus including the position detection device according to the fifth example embodiment of the present invention.

FIG. 6D is a view for explaining the structure of an index head of the processing apparatus including the position detection device according to this example embodiment. Chucks 631 are provided on a mounting table 634 of an index head 603, and are fitted into the chuck holes 612 of the pallet 601. A rotating motor 633 is attached to the mounting table 634, and the pallet 601 is rotated interlockingly with the movement of the motor 633. A detector 635 is provided on the index head 603, and the absolute data of the scale 611 provided on the bottom surface of the pallet 601 is detected by the detector 635. The processing apparatus 600 extracts a scale ID and angle data (position data) from the detected absolute data. Angle data is rotation information representing the rotated position of the pallet 601. Note that the method for extracting a scale ID and angle data is the same as those in the above-described first to forth example embodiments.

FIG. 6E is a view for explaining replacement of a pallet by the processing apparatus including the position detection device according to this example embodiment. First, a processing target object mounted on the pallet 601 (ID 025) is processed, and the pallet 601 (ID 150) on which a processing target object to be processed next is mounted is waiting on a pallet stocker 605.

When the processing of the processing target object mounted on the pallet 601 (ID 025) is completed, the pallet changer 602 lifts the pallet 601 (ID 025) that has undergone the processing and the pallet 601 (ID 150) to undergo the processing next.

When the lifted pallet changer 602 is rotated, the pallet 601 (ID 025) is replaced with the pallet 601 (ID 150), and the pallet 601 (ID 150) moves to the processing position. When the replacement of the pallets 601 (ID 025 and ID 150) is completed, the pallet changer 602 is lowered and the pallet 601 (ID 150) is set in the processing position. Thus, the replacement of the pallet 601 is completed.

Figure 6F:
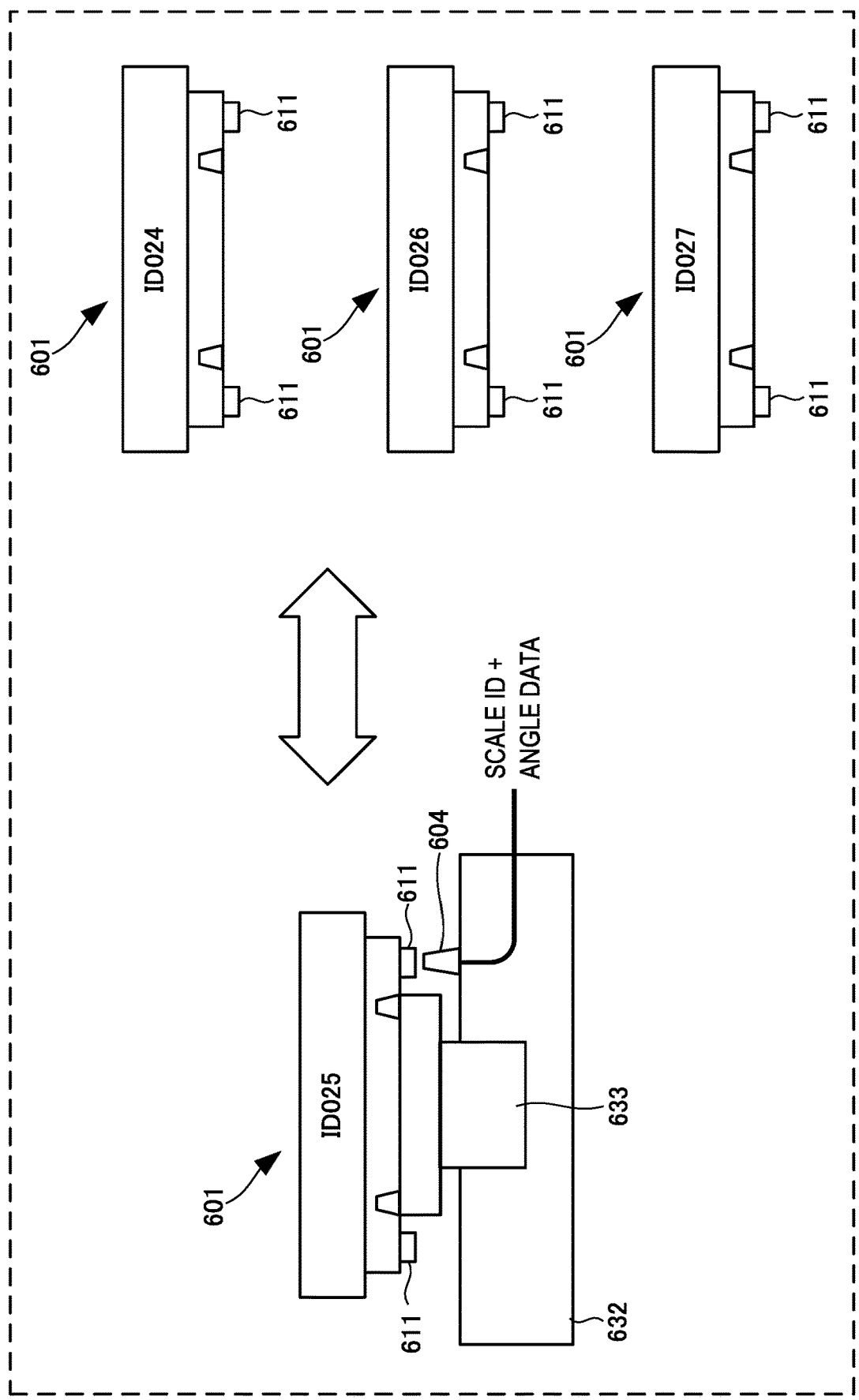
FIG. 6F is a view for explaining replacement of a plurality of pallets by the processing apparatus including the position detection device according to the fifth example embodiment of the present invention.

FIG. 6F is a view for explaining replacement of a plurality of pallets by the processing apparatus including the position detection device according to this example embodiment. As shown in FIG. 6F, if the waiting pallets 601 (ID 024, ID 026, and ID 027) are set in the pallet stocker 605, the pallet changer 602 automatically replaces the pallet 601 when the processing of the pallet 601 (ID 025) is completed. Since the absolute data embedded with a scale ID for identifying the scale 611 is recorded on the scale 611 provided in the pallet 601, the processing apparatus 600 can obtain ID information about the pallet 601 undergoing the processing, and the angle data of the pallet 601 undergoing the processing.

According to this example embodiment, not only position information representing a linear position but also information representing a rotation position can be utilized more efficiently and effectively. In addition, without assigning a scale ID to the scale, it is possible to achieve both position detection and scale identification from the absolute data recorded on the scale. Furthermore, by offsetting the offset value corresponding to the scale ID, the position data representing the position of the scale can be obtained easily and quickly.

OTHER EXAMPLE EMBODIMENTS

While the invention has been particularly shown and described with reference to example embodiments thereof, the invention is not limited to these example embodiments. It will be understood by those of ordinary skill in the art that various changes in form and details may be made therein without departing from the spirit and scope of the present invention as defined by the claims.

The above-described first to fifth example embodiments are also applicable to an M-code type absolute system.

What is claimed is:

1. A position detection device comprising:
    a plurality of scales that each records absolute data including a scale ID for separately identifying each of the plurality of scales and position data representing a position on any one of the plurality of scales;
    a detector that detects the absolute data from each of said plurality of scales;
    an extractor that is configured to extract, from the absolute data detected by the detector, the scale ID and the position data,
    wherein said extractor extracts the position data by offsetting an offset value corresponding to the scale ID from the absolute data.

2. The position detection device according to claim 1, wherein
    each of said plurality of scales includes specific absolute data, and
    said extractor comprises a storage that stores a correspondence between the specific absolute data and the scale ID.

3. The position detection device according to claim 1, wherein the detector is configured to detect and the extractor is configured to extract position data representing each of a plurality of different positions on each of the plurality of scales.

4. The position detection device according to claim 1, wherein the plurality of scales are rotatable.

5. A position detection device comprising:
    a plurality of scales that each records absolute data embedded with a scale ID for separately identifying each of the plurality of scales;
    a plurality of detectors that detect the absolute data from each of said plurality of scales;
    an extractor that is configured to extract, from the absolute data detected by the plurality of detectors, the scale ID and position data representing a position on any one of the plurality of scales, wherein
    said plurality of detectors comprises at least two detectors, and
    said extractor extracts the scale ID by comparing the absolute data detected by said at least two detectors.

6. A position detection device comprising:
    a plurality of scales that each records absolute data embedded with a scale ID for separately identifying each of the plurality of scales;
    a detector that detects the absolute data from each of said plurality of scales;
    an extractor is configured to extract, from the absolute data detected by the detector, the scale ID and position data representing a position on any one of the plurality of scales, wherein
    each of said plurality of scales includes a first data area for embedding the scale ID and a second data area for embedding the position data, and said extractor extracts the scale ID using the absolute data detected from the first data area, and extracts the position data using the absolute data detected from the second data area.

7. The position detection device according to claim 6, wherein
a value of the absolute data includes a value indicating a difference between the first data area and the second data area, and
the device further comprises a determinator that determines, based on the value indicating the difference, whether the absolute data is read from the first data area or the second data area.

8. A conveyance device comprising:
a plurality of conveyors each including a scale that records absolute data which includes a conveyor ID for separately identifying each of the plurality of conveyors and position data representing a position on any one of the plurality of conveyors;
a detector that detects the absolute data from the scale of each of said plurality of conveyors; and
an extractor that is configured to extract, from the absolute data detected by the detector, the conveyor ID and the position data,
wherein said extractor extracts the position data by offsetting an offset value corresponding to the conveyor ID from the absolute data.

9. The conveyance device according to claim 8, comprising a conveyance guide and means for moving the plurality of conveyors along the conveyance guide.

10. The conveyance device according to claim 8, wherein the detector is configured to detect and the extractor is configured to extract position data representing each of a plurality of positions on each of the plurality of conveyors.

11. A position detection device comprising:
a plurality of scales that each records absolute data including a scale ID for separately identifying each of the plurality of scales and position data representing a position on any one of the plurality of scales;
a detector that detects the absolute data from each of said plurality of scales;
an extractor that is configured to extract, from the absolute data detected by the detector, the scale ID and the position data,
wherein
each of said plurality of scales includes specific absolute data, and
said extractor comprises a storage that stores a correspondence between the specific absolute data and the scale ID, and
wherein said extractor extracts the position data by offsetting an offset value corresponding to the scale ID from the absolute data.

* * * * *